United States Patent [19]

Duan et al.

[11] Patent Number: 5,608,000

[45] Date of Patent: Mar. 4, 1997

[54] AQUEOUS POLYURETHANE DISPERSION ADHESIVE COMPOSITIONS WITH IMPROVED HEAT RESISTANCE

[75] Inventors: Youlu Duan, Minneapolis; Sonja Stammler, Marine On the St. Croix, both of Minn.

[73] Assignee: H. B. Fuller Licensing & Financing, Inc., Arden Hills, Minn.

[21] Appl. No.: 304,653

[22] Filed: Sep. 9, 1994

Related U.S. Application Data

[63] Continuation-in-part of Ser. No. 126,508, Sep. 24, 1993, abandoned.

[51] Int. Cl.⁶ .......................... C08L 75/06; C08G 18/46; C09D 175/06; C09J 175/06
[52] U.S. Cl. .................. 524/591; 428/423.1; 428/423.4; 428/423.7; 428/424.2; 428/424.6; 428/424.8; 428/425.1; 428/425.8; 524/500; 524/507; 524/840; 528/71; 528/905; 525/123; 525/127; 525/440; 525/454; 525/455; 525/457; 525/528; 525/453
[58] Field of Search .................... 524/500, 507, 524/591, 840; 528/71, 905; 525/123, 127, 457, 528, 440, 455, 454, 453; 428/423.1, 423.7, 423.4, 424.2, 424.6, 424.8, 425.1, 425.8

[56] References Cited

U.S. PATENT DOCUMENTS

| | | | |
|---|---|---|---|
| 3,169,949 | 2/1965 | Büning | 526/189 |
| 3,479,310 | 11/1969 | Dieterich et al. | 524/591 |
| 3,705,164 | 12/1972 | Honig et al. | 524/591 |
| 3,832,333 | 8/1974 | Chang et al. | 528/354 |
| 3,867,171 | 2/1975 | Ellsworth | 428/425 |
| 3,870,684 | 3/1975 | Witt et al. | 524/591 |
| 3,919,351 | 11/1975 | Chang et al. | 428/425 |
| 4,066,591 | 1/1978 | Seriven et al. | 428/425 |
| 4,092,286 | 5/1978 | Noll et al. | 156/331 |
| 4,098,743 | 7/1978 | Scriven et al. | 528/80 |
| 4,108,814 | 8/1978 | Reiff et al. | 528/71 |
| 4,110,284 | 8/1978 | Violland et al. | 528/76 |
| 4,147,679 | 4/1979 | Scriven et al. | 428/426 |
| 4,190,566 | 2/1980 | Noll et al. | 528/76 |
| 4,203,883 | 5/1980 | Hangauer, Jr. | 528/44 |
| 4,237,264 | 12/1980 | Noll et al. | 528/67 |
| 4,254,201 | 3/1981 | Sawai et al. | 430/111 |
| 4,277,380 | 7/1981 | Williams et al. | 528/71 |
| 4,303,774 | 12/1981 | Nachtkamp et al. | 528/71 |
| 4,307,219 | 12/1981 | Larson | 528/71 |
| 4,385,137 | 5/1983 | Lorenz et al. | 523/310 |
| 4,460,738 | 7/1984 | Frentzel et al. | 524/591 |
| 4,501,852 | 2/1985 | Markusch et al. | 524/591 |
| 4,540,633 | 9/1985 | Kucera et al. | 524/501 |
| 4,574,147 | 3/1986 | Meckel | 528/64 |
| 4,576,987 | 3/1986 | Crockatt et al. | 524/487 |
| 4,590,255 | 5/1986 | O'Connor et al. | 528/71 |
| 4,623,592 | 11/1986 | Daudé et al. | 428/423.3 |
| 4,636,546 | 1/1987 | Chao | 524/507 |
| 4,663,337 | 5/1987 | Das et al. | 514/382 |
| 4,711,935 | 12/1987 | Gmoser et al. | 525/452 |
| 4,762,880 | 8/1988 | Leung | 524/853 |
| 4,764,553 | 8/1988 | Mosbach et al. | 524/591 |

(List continued on next page.)

FOREIGN PATENT DOCUMENTS

| | | |
|---|---|---|
| 673432 | 4/1966 | Belgium . |
| 764009 | 7/1967 | Canada . |
| 928323 | 6/1973 | Canada . |
| 0237997A1 | 3/1987 | European Pat. Off. . |
| 0222289A3 | 5/1987 | European Pat. Off. . |
| 0296098A2 | 6/1988 | European Pat. Off. . |
| 0315832A1 | 10/1988 | European Pat. Off. . |
| 0369389A1 | 11/1989 | European Pat. Off. . |
| 0344912A3 | 12/1989 | European Pat. Off. . |
| 1443909 | 1/1965 | France . |
| 1200318 | 9/1965 | Germany . |
| 2437218 | 2/1976 | Germany . |
| 2446440 | 4/1976 | Germany . |
| 3903804 | 8/1990 | Germany . |
| 4109447 | 1/1992 | Germany . |
| 4024567A1 | 2/1992 | Germany . |
| 482761 | 1/1970 | Switzerland . |
| 1128568 | 9/1968 | United Kingdom . |
| 91/15529 | 10/1991 | WIPO . |
| 92/02568 | 2/1992 | WIPO . |
| 92/16576 | 10/1992 | WIPO . |

OTHER PUBLICATIONS

Product Brochure: Aqueous Polyurethane Dispersions From TMXDI® (META) Aliphatic Isocyanate, Feb. 1989.

NIAX® Performance Polyether Polyol PWB-1200 (From Union Carbide Corporation), undated.

Arendt, et al., "m- and p-TMXDI: Two New Isocyanates For The Polyurethane Industry," *Journal of Cellular Plastics*, Dec. 1982, pp. 376–383.

Ryan, et al., "The Development of New Aqueous Polyurethane Dispersions for Coatings," Presented at the Water–Bourne, Higher Solids, and Powder Coatings Symposium Feb. 26–28, 1992 (14 pages).

Product Brochure for Disperscoll KA–8464, Mobay Corporation, Jul., 1990.

*Primary Examiner*—Samuel A. Acquah
*Assistant Examiner*—Rabon Sergent
*Attorney, Agent, or Firm*—Vidas, Arrett & Steinkraus, P.A.

[57] ABSTRACT

Aqueous dispersion adhesives of anionic polyurethanes which have high heat resistance and low activation temperature, even when employed without addition of a crosslinker. The polyurethane is the reaction product of an isocyanate terminated polyurethane prepolymer, and a chain extender. The polyurethane prepolymer is the reaction product of a polyol component and a diisocyanate component, the polyol component including:

a sulfonated polyester polyol, a hydroxy carboxylic acid of the formula:

$$(HO)_x R(COOH)_y$$

wherein (R) represents a straight or branched, hydrocarbon radical containing 1 to 12 carbon atoms, and x and y represent values from 1 to 3, and a low molecular weight aliphatic diol having a molecular weight of from 60 to 400.

28 Claims, No Drawings

U.S. PATENT DOCUMENTS

| | | | |
|---|---|---|---|
| 4,791,168 | 12/1988 | Salatin et al. | 524/601 |
| 4,801,644 | 1/1989 | Coogan | 524/839 |
| 4,851,459 | 7/1989 | Ramalingam | 523/414 |
| 4,870,129 | 9/1989 | Henning et al. | 524/840 |
| 4,876,308 | 10/1989 | Melby et al. | 524/780 |
| 4,883,694 | 11/1989 | Ramalingam | 428/35.2 |
| 4,895,894 | 1/1990 | Ruetman et al. | 524/840 |
| 4,921,842 | 5/1990 | Henning et al. | 524/839 |
| 4,923,756 | 5/1990 | Chung et al. | 428/423.7 |
| 4,927,961 | 5/1990 | Fock et al. | 524/591 |
| 4,954,389 | 9/1990 | Acharya et al. | 428/212 |
| 4,963,637 | 10/1990 | Barksby | 528/59 |
| 5,001,189 | 3/1991 | Fock et al. | 524/840 |
| 5,023,309 | 6/1991 | Kruse et al. | 528/49 |
| 5,039,732 | 8/1991 | Arora | 524/591 |
| 5,124,424 | 6/1992 | Endo et al. | 528/48 |
| 5,250,610 | 10/1993 | Hansel et al. | 524/591 |
| 5,334,690 | 8/1994 | Schafheutle et al. | 528/71 |
| 5,344,873 | 9/1994 | Blum | 524/840 |
| 5,508,340 | 4/1996 | Hart | 524/591 |

AQUEOUS POLYURETHANE DISPERSION ADHESIVE COMPOSITIONS WITH IMPROVED HEAT RESISTANCE

CROSS-REFERENCE TO RELATED APPLICATIONS

This application is a continuation-in-part of Ser. No. 08/126,508, filed Sep. 24, 1993, now abandoned.

BACKGROUND OF THE INVENTION

1. Field of the Invention

This invention relates new aqueous polyurethane dispersion adhesive compositions which can be an one component or a two component for use in thermoforming. More particularly, this invention relates to aqueous polyurethane dispersion adhesive compositions comprising carboxylic acid and/or its salt-containing sulfonated polyurethane dispersions, and with or without compatible crosslinking agents. These new adhesive compositions exhibit good stability at low pH values, long pot life, high green strength, good water resistance and improved heat resistance.

2. Description of the Prior Art

Aqueous dispersions of polyurethanes are known and are described in, for example, U.S. Pat. No. 3,479,310; *Angew. Chem.*, 82, 53, (1972); and *Angew. Makromol. Chem.*, 98, (1981).

U.S. Pat. No. 3,479,310 to Dieterich et al discloses dispersing in water a fully chain extended, NCO-free polyurethane having internal ionic salt groups.

For anionic aqueous polyurethane dispersions, the ionic salt groups are salts of carboxylic acid or sulfonic acid.

Aqueous polyurethanes having only internal carboxylate groups as anionic moieties are stable only at pH>7. Such polyurethane dispersions can form a two component adhesive composition with a compatible crosslinker, such as polyfunctional isocyanates, epoxies or aziridines.

Henning, et al., U.S. Pat. No. 4,870,129, discloses use of the sodium salt of N-(2-aminoethyl)-2-aminoethane sulfonate acid (AAS salt) to prepare polyurethane dispersions. The aqueous polyurethane dispersions are reported to have exhibited good stability at low pH values (5–7), high green strength and medium heat resistance.

Usually, after blending the sulfonated polyurethane dispersions with a polyisocyanate crosslinker, such as the dispersible polyisocyanate in U.S. Pat. No. 4,663,377 to Hombach et al, their heat resistance will be improved.

Leung, U.S. Pat. No. 4,762,880, discloses water-based thermoforming adhesives comprising aromatic polyurethanes, cross-linking agents and others. These kind of adhesive compositions will need high temperature to activate due to the aromatic polyurethane component.

U.S. Pat. No. 4,870,129 to Henning et al discloses an adhesive consisting of an aqueous polyurethane containing chemically incorporated carboxylate or sulfonate groups. The adhesive of this reference showed low activation temperature but only medium heat resistance.

Duan et al in copending application Ser. No. 08/126,508, filed Sep. 24, 1993, disclose aqueous polyurethane dispersions based on sulfonated polyester polyols, which have an unusually high crystallization rate, while also exhibiting good stability at low pH values, high green strength and medium heat resistance.

SUMMARY OF THE INVENTION

The present invention is directed to novel aqueous sulfonated polyurethane dispersions having low activation temperatures, long pot-life and high heat resistance, even without addition of a crosslinker at the time of use. The aqueous polyurethane dispersion adhesive compositions of the invention have good compatibility with other water based polymers, such as other aqueous polyurethane dispersions either sulfonated or carboxylated polyurethane dispersions, vinyl acetate emulsions and acrylate emulsions, and also have good compatibility with thickening agents and pigments.

The compositions of the invention are aqueous dispersions of an anionic polyurethane, the polyurethane comprising the reaction product of an isocyanate terminated polyurethane prepolymer, and a chain extender, the polyurethane prepolymer comprising the reaction product of a polyol component and a diisocyanate component, the polyol component comprising:

a sulfonated polyester polyol, a hydroxy carboxylic acid of the formula:

(HO)$_x$R(COOH)$_y$ wherein (R) represents a straight or branched, hydrocarbon radical containing 1 to 12 carbon atoms, and x and y represent values from 1 to 3, and a low molecular weight aliphatic diol having a molecular weight of from 60 to 400.

The dispersions of the invention may be utilized with or without a compatible crosslinker, such as polyfunctional aziridine, zinc ammonium carbonate or zirconium carbonate. In their preferred embodiments, even the uncrosslinked adhesives provide equivalent or better heat resistance than prior art dispersions to which a cross-linker has been added at the time of use.

DETAILED DESCRIPTION OF THE INVENTION

Molecular weights referred to herein are number average molecular weights.

The isocyanate terminated polyurethane prepolymer used in the dispersions of the invention are reaction products of a polyol mixture and a polyisocyanate. The polyol mixture comprises a sulfonated polyester polyol, a hydroxy carboxylic acid and a low molecular weight diol.

The sulfonated polyester polyols used to form the isocyanate terminated polyurethane prepolymer may be any polyester polyol which incorporates sulfonate groups via sulfonate functional dicarboxylic acid residues and/or sulfonate functional diol residues. The sulfonate functional groups may be in acid or salt form. Suitable salt forms are alkali metal salts, or tertiary amine salts. Typically such sulfonate functional dicarboxylic acid residues and/or sulfonate functional diol residues are a minor portion of the diol and/diacid moieties of the polyester, preferably 1.0%–10.0% by weight of the polyester. The non-sulfonated diacids and diols used in forming the sulfonated polyesters may be aromatic or aliphatic. Examples of the non-sulfonated diacids include adipic, azelaic, succinic, suberic and phthalic acids. Examples of the non-sulfonated diols include ethylene glycol, condensates of ethylene glycols, butanediol, butenediol, propanediol, neopentylglycol, hexanediol, 1,4-cyclohexane dimethanol, 1,2-propylene glycol and 2-methyl-1,3 propanediol. Examples of the sulfonate diacids include sulfoisophthalic acid, 1,3-dihydroxybutane sulfonic acid and sulfosuccinic acid. Examples of the sulfonate diols include 1,4 dihydroxybutane sulfonic acid and succinaldehyde disodium bisulfite.

The preferred sulfonated polyester polyols are based on 5-sulfoisophthalic acid monosodium salt, 1,6-hexanediol and adipic acid. Examples of preferred conunercially available sulfonated polyester polyols are Rucoflex XS-5483-55 and Rucoflex XS-5536-60, made by Ruco Polymer Corporation. These sulfonated polyester polyols are based on 5-sulfoisophthalic acid monosodium salt (4 wt. % in XS-5483-55, and 6 wt. % in XS-5536-60), 1,6-hexanediol and adipic acid.

The sulfonated polyester polyols desirably will have a molecular weight in the range of about 500 to 10,000 and a melting temperature in the range of about 10° to 100° C. The preferred molecular weight range is about 1,000 to 4,000 and the preferred melting temperature is between 30° C. and 80° C., more preferably between 40° C. and 60° C.

The hydroxy carboxylic acids used to form the isocyanate terminated polyurethane prepolymer are compounds of the formula:

$$(HO)_xR(COOH)_y$$

wherein R represents a straight or branched, hydrocarbon radical containing 1 to 12 carbon atoms, and x and y represent values from 1 to 3. Preferably, the hydroxy carboxylic acids are α,α-dimethylol alkanoic acids represented by the formula:

$$R^1-\underset{\underset{CH_2OH}{|}}{\overset{\overset{CH_2OH}{|}}{C}}-COOH$$

where $R^1$ denotes hydrogen or an alkyl group with up to 9 carbon atoms. Examples of such compounds are 2,2-dimethylolacetic acid, 2,2-dimethylolpropionic acid, 2,2-dimethylolbutyric acid and 2,2-dimethylolpentanic acid. The preferred dihydroxyalkanoic acid is 2,2-dimethylolpropionic acid (DMPA).

The low molecular weight diols used in forming the isocyanate terminated polyurethane prepolymer are aliphatic diols, particularly alkylene diols. Their molecular weight range is from 60 to 400. Preferably, the low molecular weight diols are $C_2-C_8$ alkylene diols and most preferably $C_3-C_6$ alkylene diols examples of the diols are ethylene glycol, 1,3-propylene glycol, 1,4-butanediol (1,4-BD) and 1,6-hexanediol.

The diisocyanates which are used in forming the isocyanate terminated polyurethane prepolymer can be aliphatic or aromatic diisocyanates or their mixtures. Examples of suitable aliphatic diisocyanates are isophorone diisocyanate (IPDI), cyclopentylenediisocyanate, cyclohexylenediisocyanate, methylcyclohexylenediisocyanate, dicyclohexylmethanediisocyanate, hexamethylenediisocyanate (HDI), dicyclohexylmethanediisocyanate (H12MDI), and tetramethylxylyenediisocyanate (TMXDI). Examples of suitable aromatic diisocyanates are phenylenediisocyanate, tolylenediisocyanate (TDI), xylylenediisocyanate, biphenylenediisocyanate, naphthylenediisocyanate and diphenylmethanediisocyanate (MDI).

The polyurethane prepolymer is desirably formed in the presence of a water compatible solvent such as 1-methyl-2-pyrrolidone (NMP), dipropylene glycol methyl ether acetate (DPMA), or acetone. In the case where NMP or DPMA are used the amount of solvent used is suitably in the range of 3–15% of the final polyurethane dispersion. In the case where acetone is used, after dispersing and chain extending of the prepolymer, the acetone is then distilled off so that the final level of acetone may be as little as 1.0% or even less without disrupting the stability of the dispersion.

After the prepolymer is formed, it is dispersed in water. To accomplish dispersion, the sulfonate groups, if not already in salt form, and at least a portion of the carboxylic acid groups of the prepolymer are neutralized with a tertiary amine. The tertiary amine may be added with the water, but more preferably neutralization is accomplished before the water is added, suitably by direct addition to the prepolymer/solvent mixture.

In the aqueous dispersion the isocyanate terminated prepolymer is chain extended and terminated by reaction with primary or secondary amine functional compounds. The chain extenders used are preferably water soluble compounds as these increase the dispersibility of the polymer end product in water. Organic diamines are preferably used because they generally provide the maximum increase in molecular weight without causing gelling of the polyurethane dispersion. Useful chain extenders include aliphatic, cycloaliphatic, and aromatic diamines. Examples of suitable diamines are ethylenediamine (EDA), propylenediamine, 1,4-butylenediamine, piperazine, 1,4-cyclohexyldimethyldiamine, hexamethylenediamine (HDI), N-methylpropylenediamine, diaminophenylsulfone, diaminodiphenylether, diaminodiphenyldimethylmethane, 2,4-diamino-6-phenyltriazine, isophoronediamine, dimer fatty acid diamine, N-isodecycloxy propyl-1,3-diaminopropane and imidazolidinone functional diamines.

Examples of useful chain terminators include aminoalcohols, like ethanolamine, propanolamine, butanolamine, N-methylethanolamine, N-methylisopropanolamine, taurine and isethionic acid.

The compositions of the invention may be crosslinked by adding a crosslinker to the dispersion at, or shortly before, the time it is applied to a substrate and dried. Crosslinking may be accomplished with conventional dispersable polyisocyanate crosslinkers. However these are not preferred as optimal crosslinking performance requires a relatively high level of terminal primary or secondary amine groups in the aqueous polyurethane dispersions of the invention and therefore a correspondingly high level of diamine chain extender used in the chain extension/termination reaction. Generally, the more amine used, the more difficult it is to maintain a stable dispersion and reduce the pot-life of the dispersion after addition of the polyisocyanate crosslinker. Therefore, in a preferred embodiment of this invention, the carboxylate groups introduced into the sulfonated polyurethane polymer via the hydroxy carboxylic acid component of the polyol component are employed as crosslinking sites. The carboxylate groups are reacted with carboxylic acid reactive crosslinkers active at room temperature, such as polyfunctional aziridine compounds, zinc ammonium carbonate, zirconium carbonate or polyfunctional carbodiimide compounds.

It has been found that the aqueous polyurethane dispersion adhesive compositions of the present invention when compounded with a compatible carboxylic acid reactive crosslinker have improved heat resistance, good water resistance, and longer pot-life than obtained with conventional dispersable isocyanate crosslinkers. Typically crosslinkers are added at a level of 1–10% by weight.

It has also been found in this invention that the heat resistance of the aqueous polyurethane dispersions is significantly improved by the employment of the low molecular weight diol in forming the polyurethane prepolymer. In fact the heat resistance of the polyurethane polymer is so greatly improved by the low molecular weight diol that one component adhesive compositions used without crosslinker, in preferred embodiments of the invention, give better high temperature resistance than commercial prior art dispersion adhesives employing crosslinkers.

The high heat resistance benefits are obtained with low activation temperature. In film bonding use, the dispersion adhesive, with or without crosslinker, is applied to a film web substrate and dried, after which it is heated and the second film web substrate applied. The temperature of heating, referred to in the art as the activation temperature, is selected to provide good tack so the adhesive bonds to the second web and to change the physical properties of the adhesive by increasing the physical or chemical crosslinks so that the adhesive after heating provides a higher heat resistance, and usually higher water and solvent resistance, than before heating. Higher temperatures are frequently required to accomplish a desired change in adhesive heat resistance properties than to merely assure good adhesive wetting. Unexpectedly, it has been found that the preferred one component aqueous polyurethane dispersion adhesives not only give high heat resistance, but also do so at low heat activation temperatures. Activation temperatures as low as 125° F. have been shown to effectively implement the heat resistance properties of the inventive formulations, even without crosslinker.

In accordance with the invention, the aqueous polyurethane dispersions of the invention also have small particle sizes and excellent stability over a large pH range (3–11).

The high green strength and high heat resistance at low activation temperature makes the one-component or two-component compositions of the invention particularly useful in automotive, aerospace, shoe material bonding, woodworking, bookbinding, fiberglass sizing and film laminating applications. For instance, a one-component composition substantially as in Example 13 below, may be used in automobiles, bonding polypropylene foam to polyvinyl chloride at activation temperature of about 215° F.; in aerospace, bonding of DuPont Tedlar® PVF to phenolic composite at activation temperatures in the range of from room temperature to 210° F.; in shoemaking, bonding leather to SBR (activation temperature 150°–170° F.), and bonding highly plasticized PVC to itself or other substrates (activation temperature 150°–170° F.); in woodworking, bonding PVC to medium density fiberboard (activation temperature 150° F.); in bookbinding, bonding paper to paper using activation temperatures from room temperature to 200° F.; in house siding for bonding Tedlar® to PVC, wood, wood composite, recycled wood and/or paper products; and in laminating of films of polyethylene terephthalate to films of polypropylene, polyethylene or aluminum or other metal foils (activation temperatures of 125°–150° F.).

The formulations of the invention have good compatibility with other water based polymer dispersions even those having low pH (pH 4–7). This compatibility makes the formulations of the invention useful in blends with acrylic, epoxy and vinyl acetate or other vinyl polymer dispersions, as well as other polyurethane polymer dispersions. Blends with water based acrylic polymers can be used for shoe and fiberglass sizing applications. Blends with vinyl acetate or other vinyl polymer dispersions have use in automotive, woodworking, and bookbinding applications.

The invention is further illustrated, by the following non-limiting examples in which all pans and percentages are by weight unless otherwise specified.

EXAMPLES

Heat resistance

Drawdown polyurethane dispersion with or without a crosslinker on a 10 mil clear PVC film (polyvinyl chloride film from Laird Plastics) with a #28 Mylar rod to prime a 1×1 inch area of 1 inch wide strips of the PVC films. Dry to touch and cut the primed PVC film into 1×2 inch strips. Heat seal the primed strip to another uncoated 1×2 inch PVC strip using a Sentinal Heat Sealer at 50 psi nip pressure with a 30 second dwell time. The sealing temperature (activation temperature) selected are 125, 150, 175 and 200° F. Allow the bonds to age 7 days and then measure the heat resistance temperature.

A 100 g weight was attached to each PVC bond in a T-peel configuration and then placed in the Tenney oven. The T-peels had a 1 square inch bond area. The T-peels were subjected to a 25° C. increase in temperature each hour until 125° C. The temperatures and the times were recorded by the Tenney sensing unit upon bond failure.

The following abbreviations are used in the Examples:

| | |
|---|---|
| Rucoflex XS-5483-55 | a sulfonated polyester polyol based on 5-sulfoisophthalic acid monosodium salt, adipic acid and 1,6-hexanediol, OH number 49.0 |
| DMPA | dimethylolpropionic acid |
| 1,4-BD | 1,4-butanediol |
| TMXDI | tetramethylxylyenediisocyanate |
| IPDI | isophorone diisocyanate |
| HDI | hexamethylenediisocyanate |
| EDA | ethylenediamine |
| TEA | triethylamine |
| NMP | 1-methyl-2-pyrrolidone |
| DPMA | cupropylene glycol methyl ether acetate |
| Desmodur DA | dispersible polyisocyanate based on HDI timer (Bayer) |
| CX-100 | a 100% active polyfunctional aziridine liquid crosslinker (ICI) |

Example 1

Two component
Starting materials:

213.8 g of Rucoflex XS-5483-55

13.4 g of DMPA 40.3 g of HDI 14.6 g of TMXDI 5.1 g of EDA 9.0 g of TEA 90 g of NMP 550.4 g of water Preparation method:

The Rucoflex XS-5483-55 was dried in vacuo at 100° C. and then dissolved into the NMP at 70°–80° C. The DMPA, TMXDI and HDI were added, whereupon the temperature was maintained at about 80° F. for 3 hours and then cooled to about 65°–70° C. At this temperature, the TEA was added and stirred for 10–15 minutes. The temperature was further reduced to about 60° C., the prepolymer was dispersed by adding the water and extended by adding the EDA. A finely divided dispersion having a solids content of 32.0% and a pH of 8.5 was obtained.

100.0 g of the aqueous polyurethane dispersion prepared above was mixed with 4.0 g of Desmodur DA (DDA) at room temperature to make a two component adhesive composition.

100.0 g of the same aqueous polyurethane dispersion was mixed with 2.0 g of CX-100, a commercial polyaziridine crosslinker compound, at room temperature to make another two component adhesive composition.

The heat resistance of the aqueous polyurethane dispersion, the two-component adhesive compositions were tested. The testing results are shown in Table 2.

Example 2

Two component formulations

Starting materials:

213.8 g of Rucoflex XS-5483-55

6.7 g of DMPA 9.0 g of 1,4-BD 18.3 g of TMXDI 50.4 g of HDI 6.4 g of EDA 4.5 g of TEA 90.0 g of NMP 598.7 g of water Preparation method:

The method for preparing the dispersion of Example 2 was the same as the method for Example 1 except that the 1,4-BD was added at the same time as the DMPA. A finely divided dispersion having a solids content of 31.4% and a pH of 7.95 was obtained.

Two different two-component adhesive compositions were prepared following the same method as in Example 1. The testing results for heat resistance are shown in Table 2.

Examples 3–5

Two-component formulations

Compositions were prepared as shown in Table 1.

TABLE 1

Starting materials for Examples 3–5

| | Starting materials (g) | | |
|---|---|---|---|
| | Example 3 | Comparative Example 4 | Example 5 |
| 5484-55 | 213.8 | 213.8 | 213.8 |
| DMPA | 6.7 | 13.4 | 13.4 |
| 1,4-BD | 4.5 | 0.0 | 22.5 |
| IPDI | 22.2 | 22.2 | 49.95 |
| HDI | 33.6 | 33.6 | 75.6 |
| EDA | 5.1 | 5.1 | 11.5 |
| TEA | 4.5 | 9.0 | 9.0 |
| NMP | 90.0 | 90.0 | 90.0 |
| Water | 570.6 | 580.7 | 728.6 |
| Dispersion Properties | | | |
| Solids content | 31.5 | 31.6 | 32.6 |
| pH | 7.5 | 8.0 | 8.1 |

The preparation method for Examples 3–5 was the same as the method of Examples 1–2 except that IPDI was used instead of TMXDI.

The testing results for heat resistance are shown in Table 2, where PUD refers to the one component dispersion, PUD/DDA to its mixture with Desmondur DA crosslinker and PUD/CX100 to its mixture with CX-100 polyfunctional aziridine crosslinker.

TABLE 2

Heat Resistance Temperature (°F.) of Examples 1–5

| | Activation Temp. (°F.) | | | |
|---|---|---|---|---|
| | 125 | 150 | 175 | 200 |
| Example 1 | | | | |
| PUD | RT | 191 | 196 | 199 |
| PUD/DDA | 129 | 236 | 240 | 242 |
| PUD/CX100 | 237 | NF, ½" peeled | NF, ½" peeled | NF, ½" peeled |
| Example 2 | | | | |
| PUD | 229 | 228 | 223 | 225 |
| PUD/DDA | 231 | 235 | 238 | 243 |
| PUD/CX100 | NF, ⅞" peeled | NF, 15/16" peeled | NF, ⅞" peeled | 243 |
| Example 3 | | | | |
| PUD | 226 | 222 | 227 | 230 |
| PUD/DDA | 238 | 238 | 241 | 243 |
| PUD/CX100 | NF, ¾" peeled | NF, ¾" peeled | NF, ⅞" peeled | NF, 15/16" peeled |
| Example 4 (comparative example) | | | | |
| PUD | 218 | 219 | 218 | 226 |
| PUD/DDA | 241 | 238 | 238 | 240 |
| PUD/CX100 | 241 | 246 | NF, 15/16" peeled | NF, ¾" peeled |
| Example 5 | | | | |
| PUD | RT | 75 | 84 | 211 |
| PUD/DDA | 229 | 242 | 245 | NF, 15/16" peeled |
| PUD/CX100 | NF, ¾" peeled | NF, ¾" peeled | NF, ¾" peeled | NF, ⅞" peeled |

RT: room temperature
NF: no failure until 260° F. Where bond had begun to peel at 260° F. the extent of peeling is indicated.

Example 6

One-component formulation

Starting materials:

213.8 g of Rucoflex XS-5483-55

6.7 g of DMPA 13.5 g of 1,4-BD 21.96 g of TMXDI 60.48 g of HDI 7.65 g of EDA 4.5 g of TEA 90.0 g of NMP 627.9 g of water Preparation method:

The Rucoflex XS-5483-55 was dried in vacuo at 100° C. and then dissolved into the NMP at 70°–80° C. The DMPA, 1,4-BD, TMXDI and HDI were added, whereupon the temperature was maintained at about 80° C. for 3 hours and then cooled to 65°–70° C. At this temperature, the TEA was added and stirred for 10–15 minutes. The temperature was further cooled to about 60° C., the prepolymer was dispersed by adding the water and extended by adding the EDA.

A finely divided dispersion having a solids content of 31.4% and a pH of 7.3 was obtained. This dispersion had good water resistance and high heat resistance and could be used as a one-component adhesive.

The test results for heat resistance of the dispersion are shown in Table 4.

Examples 7–14

One-component formulations

TABLE 3

| Starting materials | Example 7 | Example 8 | Example 9 | Example 10 | Example 11 | Example 12 | Example 13 | Example 14 |
|---|---|---|---|---|---|---|---|---|
| Rucoflex XS-5483-55 | 213.8 | 213.8 | 213.8 | 213.8 | 213.8 | 213.8 | 213.8 | 213.8 |
| DMPA | 13.4 | 13.4 | 13.4 | 13.4 | 6.7 | 6.7 | 6.7 | 6.7 |
| 1,4-BD | 13.5 | 4.5 | 9.0 | 13.5 | 9.0 | 13.5 | 9.0 | 9.0 |
| TMXDI | 25.62 | 0 | 0 | 0 | 0 | 0 | 0 | 0 |
| IPDI | 0 | 27.75 | 33.3 | 38.85 | 27.75 | 33.3 | 27.75 | 27.75 |
| HDI | 70.56 | 42.0 | 50.4 | 58.8 | 42.0 | 50.4 | 42.0 | 42.0 |
| EDA | 8.93 | 6.38 | 7.65 | 8.93 | 6.38 | 7.65 | 6.38 | 5.63 |
| TEA | 9.0 | 9.0 | 9.0 | 9.0 | 4.5 | 4.5 | 4.0 | 4.0 |
| Acetone | 0 | 0 | 0 | 0 | 0 | 0 | 50.0 | 50.0 |
| NMP | 90.0 | 90.0 | 90.0 | 90.0 | 90.0 | 90.0 | 0 | 0 |
| Water | 667.2 | 610.2 | 639.8 | 669.4 | 600.2 | 629.8 | 558.0 | 574.5 |

Preparation method:

The dispersion preparation method Examples 7–14 was the same as the method of Example 6 except for the use of IPDI instead of TMXDI in Examples 8–14 and the use of acetone solvent in Examples 13–14 in place of NMP solvent. The testing results of the heat resistance are shown in Table 4.

All of the dispersion prepared in Examples 7–14 have good water resistance and high heat resistance and can be used as one-component adhesives.

TABLE 4

Heat resistance temperature (°F.) of Examples 6–12

| | Activation temp. (°F.) | | | |
|---|---|---|---|---|
| | 125 | 150 | 175 | 200 |
| Example 6 | <100 | 206 | NF, ¾" peeled | NF, ½" peeled |
| Example 7 | 236 | NF, ⅞" peeled | NF, ¾" peeled | NF, ¾" peeled |
| Example 8 | NF, 15/16" peeled | NF, 15/16" peeled | 225 | NF, 15/16" peeled |
| Example 9 | NF, ½" peeled | NF, ¼" peeled | NF, 1/16" peeled | NF, 1/16" peeled |
| Example 10 | NF, ¼" peeled | NF, ¼" peeled | NF, 1/32" peeled | NF, 1/32" peeled |
| Example 11 | NF, ⅛" peeled | NF, ⅛" peeled | NF, 3/16" peeled | NF, ¼" peeled |
| Example 12 | NF, 1/16" peeled | NF, 1/16" peeled | NF, ⅛" peeled | NF, 1/16" peeled |
| Example 13 | NF | NF | NF | NF |
| Example 14 | NF | NF | NF | NF |

NF: no failure until 260° F.

Example 15 (Comparative Example)

In this example, formulations of Disperecoll KA 8464, an aqueous polyurethane dispersion product of Bayer Corporation, based on HDI and IPDI (Formulation B), and of an embodiment of the sulfonated polyester containing polyurethane dispersion invention of copending application Ser. No. 08/126,508, filed Sep. 24, 1993 (Formulation A), were prepared and tested for heat resistance in one component and two-component compositions, the second component being a commercial polyisocyanate crosslinker. The crosslinker employed was Desmodur DA (Bayer, a dispersible polyisocyanate based on trimer of hexamethylenediisocyanate). The sulfonated polyester containing polyurethane dispersion, Formulation A, was prepared from the following ingredients:

5.0% Rucofiex XS-5483-55 (sulfonated polyester polyol based on 5 sulfoisophthalic acid monosodium salt, adipic acid and 1,6-hexanediol, OH number 49.0)

3.4% hexamethylene diisocyanate (HDI)

1.2% tetramethylxylylene diisocyanate (TMXDI)

0.4% ethylenediamine (EDA)

60.0% water

Heat resistance was determined as in the previous examples.

TABLE 5

| | Heat resistance (°F.) | | | |
|---|---|---|---|---|
| | Activation temp. (°F.) | | | |
| Formulation | 125 | 150 | 175 | 200 |
| A | 221 | 227 | 225 | 233 |
| A + 5% Desmodur DA | 219 | 236 | 244 | 238 |
| B | 199 | 220 | 221 | 223 |
| B + 5% Desmodur DA | 247 | NF to 260½" peeled | NF to 260 | NF to 260 |

*PVC as substrate
NF = No failure until 260° F.

Comparison of the results shown in Tables 4 and 5 demonstrate that the use of the compositions of the invention as one-component adhesives provides adhesive bonds which are comparable in strength to prior art two-component crosslinked PUD formulations.

Example 16

Films made from the one-component aqueous polyurethane dispersions of Examples 8–14 were immersed in water for 7 days, after which they had not changed. Films made from KA-8464 in Example 15 (uncrosslinked), by contrast, had totally lost their strength after immersing in water for only 1 day.

Examples 17–18

| Starting materials: | Example 17 | Example 18 |
|---|---|---|
| Rucoflex XS-5483-55 | 213.8 g | 213.8 g |
| DNDA | 6.7 g | 13.4 g |
| 1,4-BD | 4.5 g | 22.5 g |
| IPDI | 66.6 g | 149.9 g |
| Dibutyltin dilaurate | 2 drops | 3 drops |
| EDA | 3.83 g | 11.5 g |
| TEA | 4.0 g | 9.0 g |
| NMP | 88.3 g | 123.3 g |
| water | 588.3 g | 821.5 g |

Preparation method:

The Rucoflex XS-5483-55 was dried in vacuo at 100° C. and then dissolved into the NMP at 70°–80° C. The DMPA, 1,4-BD, and IPDI were added, whereupon the temperature was maintained at about 85° C. for 3 hours and then cooled to 65°–70° C. At this temperature, the TEA was added and stirred for 10–13 minutes. The temperature was further cooled to about 60° C., the prepolymer was dispersed by adding the water and extended by adding the EDA.

| Properties: | Example 17 | Example 18 |
|---|---|---|
| Solids (%) | 31.1 | 30.9 |
| pH | 9.5 | 9.8 |
| Particle size (nm) | 126 | 101 |
| Viscosity (cps) | 250 | 400 |

Crosslinkers used were 5% by weight Desmondur DA and 2% by weight CX-100. Heat resistance was determined as in the previous examples. Results are shown in Table 6.

TABLE 6

Heat Resistance Temperature (°F.) of Examples 17–18

| | Activation Temp. (°F.) | | | |
|---|---|---|---|---|
| | 125 | 150 | 175 | 200 |
| *Example 17* | | | | |
| PUD | 137 | 189 | 193 | 194 |
| PUD/DDA | NF, ⅓" peeled | NF, ⅔" peeled | NF, ½" peeled | NF, ¼" peeled |
| PUD/CX100 | NF, ⅓" peeled | 248 | NF, ⅞" peeled | NF, ¾" peeled |
| *Example 18* | | | | |
| PUD | RT | RT | RT | 90 |
| PUD/DDA | 232 | 236 | 243 | 243 |
| PUD/CX100 | NF, ⅔" peeled | NF, ⅔" peeled | NF, ½" peeled | NF, ½" peeled |

What is claimed is:

1. An aqueous dispersion of an anionic polyurethane, the polyurethane comprising the reaction product of an isocyanate terminated polyurethane prepolymer, and an amine functional chain extender, the polyurethane prepolymer comprising the reaction product of a polyol component and a diisocyanate component, the polyol component comprising:

a sulfonated polyester polyol, a hydroxy carboxylic acid of the formula:

$(HO)_xR(COOH)_y$ wherein (R) represents a straight or branched, hydrocarbon radical containing 1 to 12 carbon atoms, and x and y represent values from 1 to 3, and a low molecular weight aliphatic diol having a number average molecular weight of from 60 to 400.

2. A dispersion as in claim 1 wherein the low molecular weight aliphatic diol is a $C_2$-$C_8$ alkylene diol.

3. A dispersion as in claim 2 wherein the low molecular weight aliphatic diol is ethylene glycol, 1,3-propylene glycol, 1,4-butanediol or 1,6-hexanediol.

4. A dispersion as in claim 1 wherein the sulfonated polyester polyol is a hydroxy terminated polyester formed of residues from at least one carboxylic diacid, at least one diol and at least one sulfonate diacid or sulfonate diol.

5. A dispersion as in claim 4 wherein the carboxylic diacid residue of the sulfonated polyester polyol comprises the residue of a diacid selected from the group consisting of adipic, azelaic, succinic, suberic and phthalic acids.

6. A dispersion as in claim 4 wherein the diol residue of the sulfonated polyester polyol comprises the residue of a diol selected from the group consisting of ethylene glycol, condensates of ethylene glycols, butanediol, butenediol, propanediol, neopentyl glycol, hexanediol, 1,4-cyclohexane dimethanol, 1,2-propylene glycol and 2-methyl-1,3-propanediol.

7. A dispersion as in claim 4 wherein the sulfonate diacid or sulfonate diol residue comprises the residue of at least one member of the group consisting of sulfoisophthalic acid, sulfosuccinic acid, 1,4-dihydroxybutane sulfonic acid and succinaldehyde disodium bisulfite.

8. A dispersion as in claim 1 wherein the sulfonated polyester polyol is based on 5-sulfoisophthalic acid monosodium salt, 1,6-hexanediol and adipic acid.

9. A dispersion as in claim 1 wherein the sulfonated polyester polyol has a number average molecular weight in the range of about 500 to 10,000 and a melting temperature in the range of about 10° to 100° C.

10. A dispersion as in claim 9 wherein the number average molecular weight range is about 1,000 to 4,000 and the melting temperature is about 40° to 60° C.

11. A dispersion as in claim 10 wherein the polyisocyanate is a mixture of hexamethylenediisocyanate (HDI) and one of tetramethylxylylenediisocyanate (TMXDI) and isophoronediisocyanate (IPDI).

12. A dispersion as in claim 11 wherein the polyisocyanate is a mixture of HDI and IPDI, the hydroxycarboxylic acid is 2,2-dimethylolpropionic acid (DMPA) and the low molecular weight aliphatic diol is 1,4-butanediol.

13. A dispersion as in claim 12 wherein the polyurethane prepolymer is the reaction product of said polyol and polyisocyanate components in the following weight ratios, based on 100 parts by weight of said polyol and polyisocyanate:

Sulfonated polyester polyol from about 63.2 to about 71.5

DMPA from about 2.1 to about 4.4

1,4-butanediol from about 1.5 to about 4.2

IPDI from about 9.1 to about 11.5

HDI from about 13.9 to about 15.9.

14. A dispersion as in claim 1 wherein the hydroxy carboxylic acid is a α,α-dimethylol alkanoic acid represented by the formula:

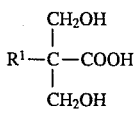

where $R^1$ denotes hydrogen or an alkyl group with up to 9 carbon atoms.

15. A dispersion as in claim 14 wherein the α,α-dimethylol alkanoic acid is selected from the group consisting of 2,2-dimethylolacetic acid, 2,2-dimethylolpropionic acid, 2,2-dimethylolbutyric acid, 2,2-dimethylolpentanic acid and mixtures thereof.

16. A dispersion as in claim 15 wherein the α,α-dimethylol alkanoic acid is 2,2-dimethylolpropionic acid.

17. An adhesive formulation prepared by blending a dispersion as in claim 1 with an acid reactive crosslinking agent.

18. An adhesive formulation as in claim 17 wherein the crosslinking agent is selected from the group consisting of polyfunctional aziridines, zinc ammonium carbonate and zirconium carbonate.

19. An adhesive as in claim 17 wherein the crosslinking agent is a polyfunctional aziridine, the adhesive having a heat resistance temperature of at least 260° F., said heat resistance temperature being the temperature at which a 100 gm load is dropped, said load being attached in T-peel configuration on a 1 inch by 1 inch laminate of PVC films prepared by applying the adhesive to one of said films, drying the adhesive, applying the second of said films at an activation temperature of no more than 150° F. and then aging the laminate for 7 days.

20. An adhesive formulation prepared by blending a dispersion as in claim 1 with a polyisocyanate crosslinking agent.

21. A bonded assembly of a pair of substrates, the assembly bonded with an adhesive comprising a dried dispersion of claim 1.

22. A bonded assembly as in claim 21 wherein, the substrate pairs include a member made of a material selected from the group consisting of polypropylene, polyvinyl chloride, phenolic composite, leather, styrene-butadiene rubber, fiberboard, paper, polyvinyl fluoride, wood, wood composite, recycled wood, polyethylene terephthalate, polyethylene, and metal.

23. A bonded assembly as in claim 21 wherein said dispersion consists essentially of said polyurethane.

24. A bonded assembly as in claim 21 wherein said dispersion further comprises at least one of an acrylic, an epoxy, a vinyl, or a second polyurethane polymer.

25. A bonded assembly as in claim 21 wherein said adhesive further comprises a polyisocyanate or acid reactive crosslinker.

26. A bonded assembly as in claim 21 wherein said substrate pair is selected from the group consisting of polypropylene foam/polyvinyl chloride; polyvinyl fluoride/phenolic composite; leather/styrene-butadiene rubber; PVC/fiberboard; paper/paper; polyvinyl fluoride/polyvinyl chloride; polyvinyl fluoride/wood; polyvinyl fluoride/wood composite; polyvinyl fluoride/recycled wood; polyvinyl fluoride/paper products; polyethylene terephthalate/polypropylene; polyethylene terephthalate/polyethylene; polyethylene terephthalate/metal and plasticized polyvinyl chloride/plasticized polyvinyl chloride.

27. An adhesive formulation prepared by blending a dispersion as in claim 1 with at least one of an acrylic, an epoxy, a vinyl, or a second polyurethane polymer.

28. A dispersion as in claim 1 having a heat resistance temperature of at least 260° F., said heat resistance temperature being the temperature at which a 100 gm load is dropped, said load being attached in T-peel configuration on a 1 inch by 1 inch laminate of PVC films prepared by applying the dispersion, without any added crosslinker, to one of said films, drying the dispersion, applying the second of said films at an activation temperature of no more than 200° F. and then aging the laminate for 7 days.

* * * * *